US006841116B2

(12) United States Patent
Schmidt

(10) Patent No.: US 6,841,116 B2
(45) Date of Patent: Jan. 11, 2005

(54) SELECTIVE DEPOSITION MODELING WITH CURABLE PHASE CHANGE MATERIALS

(75) Inventor: Kris Alan Schmidt, Granada Hills, CA (US)

(73) Assignee: 3D Systems, Inc., Valencia, CA (US)

( * ) Notice: Subject to any disclaimer, the term of this patent is extended or adjusted under 35 U.S.C. 154(b) by 371 days.

(21) Appl. No.: 09/971,337

(22) Filed: Oct. 3, 2001

(65) Prior Publication Data

US 2003/0083771 A1 May 1, 2003

(51) Int. Cl.[7] .......................... B29C 35/08; B29C 41/02
(52) U.S. Cl. .................... 264/401; 425/174.4; 425/375
(58) Field of Search ...................... 264/401; 425/174.4, 425/375

(56) References Cited

U.S. PATENT DOCUMENTS

| 5,134,569 | A | 7/1992 | Masters |
| 5,136,515 | A | 8/1992 | Helinski |
| 5,380,769 | A | 1/1995 | Titterington et al. |
| 5,555,176 | A | 9/1996 | Menhennett et al. |
| 5,855,836 | A | 1/1999 | Leyden et al. |
| 5,866,058 | A | 2/1999 | Batchelder et al. |
| 5,943,235 | A | 8/1999 | Earl et al. |
| 6,132,665 | A | 10/2000 | Bui et al. |
| 6,133,355 | A | 10/2000 | Leyden et al. |
| 6,193,922 | B1 | 2/2001 | Ederer |
| 6,193,923 | B1 | 2/2001 | Leyden et al. |
| 6,228,923 | B1 | 5/2001 | Lombardi et al. |
| 6,259,962 | B1 | 7/2001 | Gothait |
| 6,492,651 | B2 * | 12/2002 | Kerekes ................. 250/559.2 |

FOREIGN PATENT DOCUMENTS

| WO | WO 97/11837 A1 | 4/1997 |
| WO | WO 00/11092 A1 | 3/2000 |
| WO | WO 00/52624 A1 | 9/2000 |
| WO | WO 00/76772 A1 | 12/2000 |
| WO | WO 01/26023 A1 | 4/2001 |
| WO | WO 01/68375 A2 | 9/2001 |

* cited by examiner

Primary Examiner—Leo B. Tentoni
(74) Attorney, Agent, or Firm—James E. Curry; Ralph D'Alessandro

(57) ABSTRACT

A selective deposition modeling method and apparatus for dispensing a curable phase change material. The dispensing temperature of the material is set at or less than a thermally stable temperature value for the material in which the reactive component of the material remains substantially uncured when held at the temperature for a desired time period. The dispensed material is provided with an environment that enables the material to solidify to form layers of the object. The solidified material is normalized to a desired layer thickness and is then cured by exposure to actinic radiation. In a preferred embodiment a UV curable phase change material is dispensed at about 80° C. and has a viscosity of about 13 to about 14 centipoise at this temperature. The cured material provides substantially increased physical properties over thermoplastic phase change materials previously used in selective deposition modeling.

66 Claims, 3 Drawing Sheets

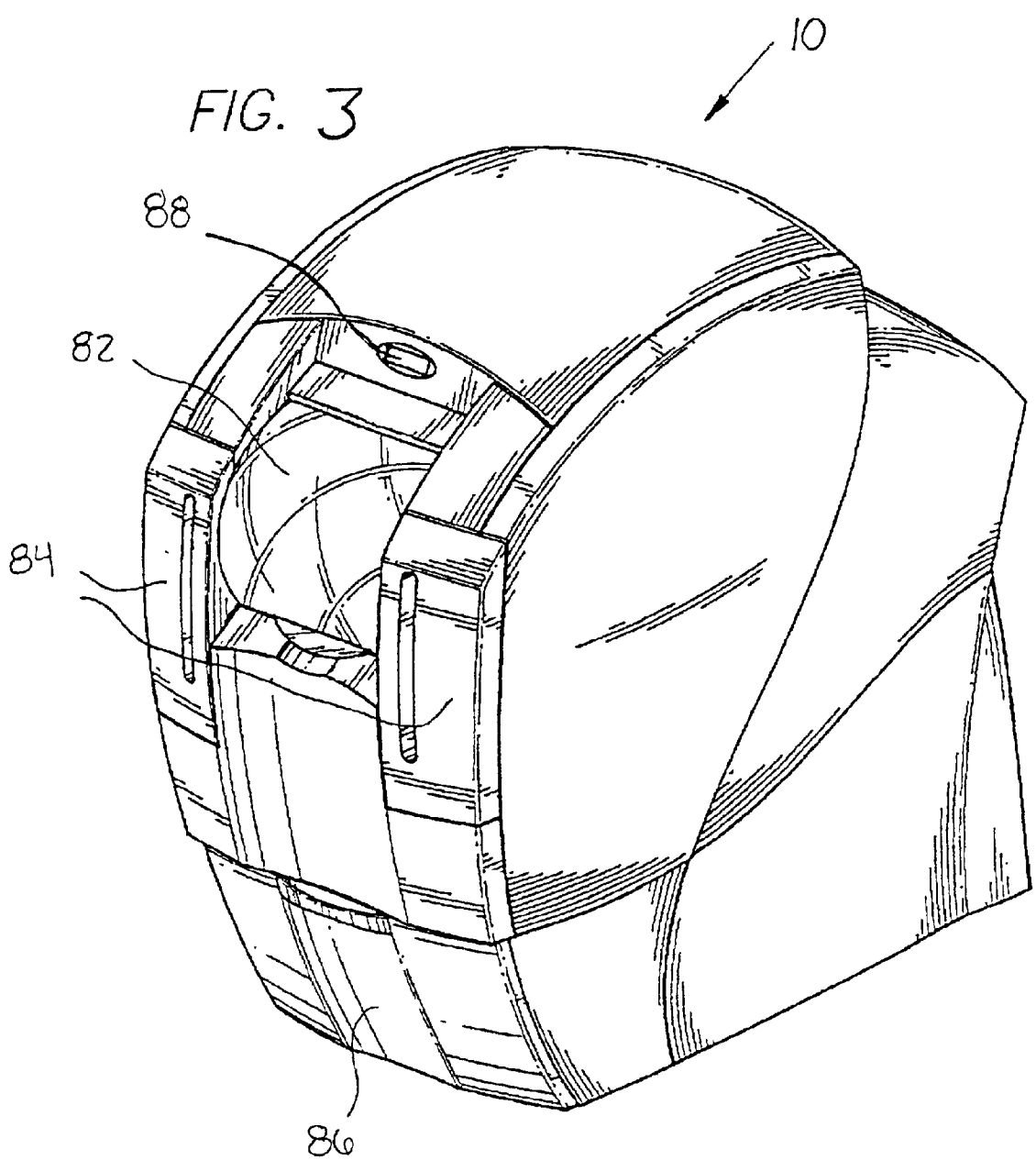

SELECTIVE DEPOSITION MODELING WITH CURABLE PHASE CHANGE MATERIALS

BACKGROUND OF THE INVENTION

1. Field of the Invention

The invention relates in general to solid deposition modeling, and in particular to a method and apparatus for dispensing a curable phase change material to form a three-dimensional object. The curable phase change material is dispensed in a flowable state that solidifies after being dispensed, and is then cured by exposure to actinic radiation.

2. Description of the Prior Art

Recently, several new technologies have been developed for the rapid creation of models, prototypes, and parts for limited run manufacturing. These new technologies are generally called Solid Freeform Fabrication techniques, and are herein referred to as "SFF". Some SFF techniques include stereolithography, selective deposition modeling, laminated object manufacturing, selective phase area deposition, multi-phase jet solidification, ballistic particle manufacturing, fused deposition modeling, particle deposition, laser sintering, and the like. Generally in SFF techniques, complex parts are produced from a modeling material in an additive fashion as opposed to conventional fabrication techniques, which are generally subtractive in nature. For example, in most conventional fabrication techniques material is removed by machining operations or shaped in a die or mold to near net shape and then trimmed. In contrast, additive fabrication techniques incrementally add portions of a build material to targeted locations, layer by layer, in order to build a complex part. SFF technologies typically utilize a computer graphic representation of a part and a supply of a building material to fabricate the part in successive layers. SFF technologies have many advantages over conventional manufacturing methods. For instance, SFF technologies dramatically shorten the time to develop prototype parts and can produce limited numbers of parts in rapid manufacturing processes. They also eliminate the need for complex tooling and machining associated with conventional subtractive manufacturing methods, including the need to create molds for custom applications. In addition, customized objects can be directly produced from computer graphic data in SFF techniques.

Generally, in most SFF techniques, structures are formed in a layer by layer manner by solidifying or curing successive layers of a build material. For example, in stereolithography a tightly focused beam of energy, typically in the ultraviolet radiation band, is scanned across a layer of a liquid photopolymer resin to selectively cure the resin to form a structure. In Selective Deposition Modeling, herein referred to as "SDM" a phase change build material is jetted or dropped in discrete droplets, or extruded through a nozzle, to solidify on contact with a build platform or previous layer of solidified material in order to build up a three-dimensional object in a layerwise fashion. Other synonymous names for SDM used in this new industry are: solid object imaging, deposition modeling, multi-jet modeling, three-dimensional printing, thermal stereolithography, and the like. Often, a thermoplastic material having a low-melting point is used as the solid modeling material, which is delivered through a jetting system such as an extruder or print head. One type of SDM process which extrudes a thermoplastic material is described in, for example, U.S. Pat. No. 5,866,058 to Batchelder et al. One type of SDM process utilizing ink jet print heads is described in, for example, U.S. Pat. No. 5,555,176 to Menhennett et al. Some thermoplastic build materials used in SDM are available and sold under the names Thermojet® 2000 and Thermojet® 88 by 3D Systems, Inc. of Valencia, Calif. Also, some formulations for thermoplastic phase change build materials are disclosed in U.S. Pat. No. 6,132,665 to Bui et al.

SDM systems utilizing phase change materials have certain advantages over other SFF systems such as stereolithography. One significant advantage of SDM systems is that they are significantly less expensive than stereolithography systems. This is generally due to the use of relatively low cost dispensing devices employed in SDM systems such as ink jet print heads, instead of the expensive lasers and scanning components used in stereolithography systems. Another advantage of SDM is that the phase change build materials typically used are non-irritating and can be handled directly without the need for special handling procedures. In addition, since they do not utilize lasers that generate concentrated beams of radiation, the safety procedures required for working with laser are not needed. Hence SDM systems are preferable in office environments since special handling procedures and/or safety procedures are not required.

However, SDM systems have some disadvantages compared to stereolithography systems. One disadvantage is that the three-dimensional objects formed from conventional thermoplastic materials by SDM exhibit inferior mechanical properties compared to objects formed by stereolithography. This is generally due to the high wax content needed in the material to provide the necessary phase change characteristics for dispensing. Since wax has very little tensile strength, the high wax content significantly reduces the mechanical properties of the resultant objects formed. In addition, because most current materials used in SDM systems are phase change thermoplastic materials, the formed objects are temperature sensitive. For example, at somewhat elevated temperatures the objects start to become tacky or sticky, which is undesirable.

The need to develop a build material for use in SDM systems with improved mechanical properties has existed for quite some time. One of the first proposals was to develop an ultraviolet radiation (UV) curable phase change material that could be cured after being deposited from a dispensing device used in a SDM system. In theory, once the deposited material is cured by flood exposure to UV radiation, the final object would exhibit superior mechanical properties similar to those properties achieved in stereolithography using liquid photopolymers. Until recently, however, successfully dispensing a radiation curable phase change material in a SDM system has proven problematic.

One of the first suggestions of using a radiation curable build material is found in U.S. Pat. No. 5,136,515 to Helinski, wherein it is proposed to selectively dispense a UV curable build material in a SDM system. However no UV curable formulations are disclosed. Some of the first UV curable material formulations proposed for use in SDM systems are found in Appendix A of International Patent Publication No. WO 97/11837, where three reactive material compositions are provided. However, there is no discussion of these formulations in the specification. Further, U.S. Pat. No. 6,133,355 to Leyden et al., which lists the same three formulations and is related to WO 97/11837, indicates it is preferred to dispense them from the print head at a temperature between 90° C. and 140° C. Leyden further mentions that a reactive phase change build material formulation would have to comprise no less than 20% by weight of a reactive photopolymer component in order to realize the advantages of the reactive component. Leyden also mentions that the reactive phase change build material formulation should have a viscosity of between 18–25 centipoise at a dispensing temperature between about 125° to 130° C. However, there is no mention whether the formulations were successfully dispensed. These reactive formulations are also disclosed in U.S. Pat. No. 5,855,836 to Leyden et al. as well.

A main requirement for any material used in SDM is that it be dimensionally stable or solid at ambient temperatures and be molten or liquid at an elevated temperature induced by the application of heat. In both ink jet printing and SDM utilizing ink jet print heads, the dispensing temperature must be at least equal to the melting point at which the material transitions to the molten or liquid state. In ink jet printing processes phase change ink materials are dispensed in a molten or liquid state from ink jet print heads at a temperature of between about 85° C. to 150° C., as discussed, for example, in U.S. Pat. No. 5,380,769 to Titterington et al. In SDM, phase change thermoplastic materials are typically dispensed from an ink jet print head at about 130° C., as discussed, for example, in U.S. Pat. No. 6,133,355 to Leyden et al. Further, a reactive material formulation intended to be dispensed in a SDM method with an ink jet print head at a temperature preferably at about 140° C. is disclosed in U.S. Pat. No. 5,855,836 to Leyden et al. Also, a UV curable phase change formulation intended to be dispensed at 130° C. with a viscosity of between 20–25 centipoise is disclosed in International Patent Application WO 00/11092. Thus, the SDM techniques of the prior art indicate that curable phase change materials should be dispensed at temperatures of around 130° C., and in two-dimensional printing dispensing temperatures are generally between about 85° C. to 150° C.

However, thermal stability becomes a significant problem for curable phase change materials held these elevated dispensing temperatures for extended periods of time. In WO 00/11092 this thermal instability problem was initially discovered by measuring an increase in viscosity of the material when held at about 130° C. for extended periods of time.

It is believed this increase in viscosity is caused by thermal initiation of the cure process, wherein the long reactive molecules start to cross-link. This is undesirable as thermal initiation of the cure process can clog the dispensing orifices of the print head and cause the apparatus to malfunction. Attempting to address this problem, WO 00/11092 suggests keeping the material at a lower temperature (100° C.) in a holding container prior to being delivered to the print head which dispenses the material at a temperature of about 130° C. However, this still does not eliminate cross-linking, which can still occur in the ink jet print head and undesirably cause the print head to malfunction. Further, cross-linking may also occur in the holding container that can degrade the material to the point where it can no longer be properly dispensed.

The thermal initiation of cross-linking in curable phase change materials dispensed from ink jet print heads is no trivial problem. In order to obtain the desired mechanical strengths in the resultant objects, a sufficient quantity of reactive high molecular weight components, such as monomers, oligomers, multifunctional acrylates, and the like, are needed. However these components increase the viscosity of the formulated material in the flowable state, and often this increase is well beyond the viscosity range capability of the print head. Previously expedients in SDM have attempted to dispense the materials at the highest temperature possible where the viscosity would be low enough to meet the specifications of the ink jet print heads. However, this approach does not work for UV curable materials because the high dispensing temperatures can initiate the cure process, which can increase the viscosity of the material and undesirably effect dispensing. Adding low molecular weight monomers to lower the viscosity of the formulation can help; however, odor problems can arise, as these monomers tend to evaporate and condense within the machine causing contamination that can cause the machine to malfunction. Thus, including low molecular weight monomers is desirably minimized.

The cross-linking problem is further complicated since the trend in the ink jet printing industry is to achieve higher printing resolution by decreasing the size of the orifices in the print head. As orifice size decrease, the viscosity requirements for the material being dispensed must decrease. First generation phase change ink jet print heads required a viscosity of between about 18–25 centipoise at the dispensing temperature. Current specifications typically require a viscosity of about 13 and about 14 centipoise at the dispensing temperature, such as the Z850 printhead used in the Phaser® 850 printer available from Xerox Corporation of Wilsonville, Oreg. Next generation print heads may require even lower viscosity values, such as about 10 centipoise or less. As the viscosity values required for ink jet print heads continue to decrease, formulating phase change materials to meet these requirements becomes exceedingly difficult, particularly for radiation curable phase change materials.

More recent teachings of using curable materials in three-dimensional printing is provided in U.S. Pat. No. 6,259,962 to Gothait and in International Publication Number WO 01/26023. However, it is unknown whether these materials are phase change materials that solidify upon being dispensed. There is no mention of the melting point and freezing point of the materials. Further, in neither of these references is the problem of cross-linking and thermal stability mentioned, nor is there disclosure of the material formulations, viscosity values, or dispensing temperature.

Thus, there is a need to develop a method and apparatus capable of dispensing radiation curable phase change material in SDM while eliminating the thermal stability problems associated in dispensing the material. These and other difficulties of the prior art have been overcome according to the present invention.

BRIEF SUMMARY OF THE INVENTION

The present invention provides its benefits across a broad spectrum. While the description which follows hereinafter is meant to be representative of a number of such applications, it is not exhaustive. As will be understood, the basic methods and apparatus taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to successfully dispense a curable phase change material in a flowable state in a SDM apparatus that solidifies rapidly after being dispensed and is then cured by exposure to actinic radiation.

It is another aspect of the present invention to dispense a curable phase change material at a dispensing temperature that is at or below a thermally stable temperature value for the material.

It is a feature of the present invention that the a radiation curable phase change material can be held at the dispensing temperature for a desired time period in which the reactive component of the material remains substantially uncured.

It is another feature of the present invention to formulate a radiation curable phase change material that has a viscosity value of between about 13 to about 14 centipoise at the dispensing temperature.

It is an advantage of the present invention that the three-dimensional objects formed have superior mechanical properties compared to objects formed by SDM using thermoplastic phase change build materials.

It is another advantage of the present invention that a curable phase change material can be dispensed to form a three-dimensional object in conjunction with dispensing a non-curable support material that can be easily removed by application of a solvent or by heat.

The method of the present invention comprises controllably dispensing a curable phase change material in a flowable state, providing an environment that lowers the temperature of the material to cause the material to solidify in layers to form the object, supporting the dispensed material and providing a working surface in which to dispense subsequent layers of material, and curing the material by exposure to actinic radiation. Unique to the present invention is that the curable phase change material is dispensed at a temperature that does not exceed a thermally stable temperature of the material. This thermally stable temperature is the maximum temperature that the material can be maintained at for a desired time period while the reactive component of the material remains substantially uncured, preferably between about 2 and about 8 weeks. In one embodiment, the curable phase change material has a melting point that does not exceed about 80° C. and has a viscosity that does not exceed about 18 centipoise at the dispensing temperature. Preferably, the dispensing temperature is about 80° C. and the material has a viscosity of between about 13 and about 14 centipoise at the dispensing temperature. Preferably the material has a freezing point above ambient temperature so that the material rapidly solidifies after being dispensed to form a paste-like, non-flowable state. A planarizer is then drawn across the layer to smooth the layer and normalize the layer to a desired thickness. Preferably the layer is then provided with a flood exposure to actinic radiation to cure the layer. Alternatively, however, multiple layers could be dispensed and planarized and then provided with a flood exposure to actinic radiation. The steps are repeated until a three-dimensional object is formed having superior mechanical properties compared to objects previously formed with thermoplastic phase change materials.

The apparatus of the present invention comprises a computer system for processing data corresponding to layers of the object, a means for dispensing the curable phase change material, a means for supporting the dispensed material, and a means for exposing the material to actinic radiation. In addition, the preferred embodiment includes a means for delivering the curable phase change material to an ink jet print head that dispenses the material, and includes a means for collecting and removing the waste material from the planarizer.

In a preferred embodiment, the apparatus also dispenses a non-curable phase change support material that can be easily removed by application of a solvent or by heat.

These and other aspects, features, and advantages are achieved/attained in the method and apparatus of the present invention.

BRIEF DESCRIPTION OF THE DRAWINGS

The aspects, features, and advantages of the present invention will become apparent upon consideration of the following detailed disclosure of the invention, especially when it is taken in conjunction with the accompanying drawings wherein:

FIG. 3 is an isometric view of the apparatus of FIG. 2 for practicing the present invention.

To facilitate understanding, identical reference numerals have been used, where possible, to designate identical elements that are common in the figures.

DETAILED DESCRIPTION OF THE PREFERRED EMBODIMENTS

Figure 1:
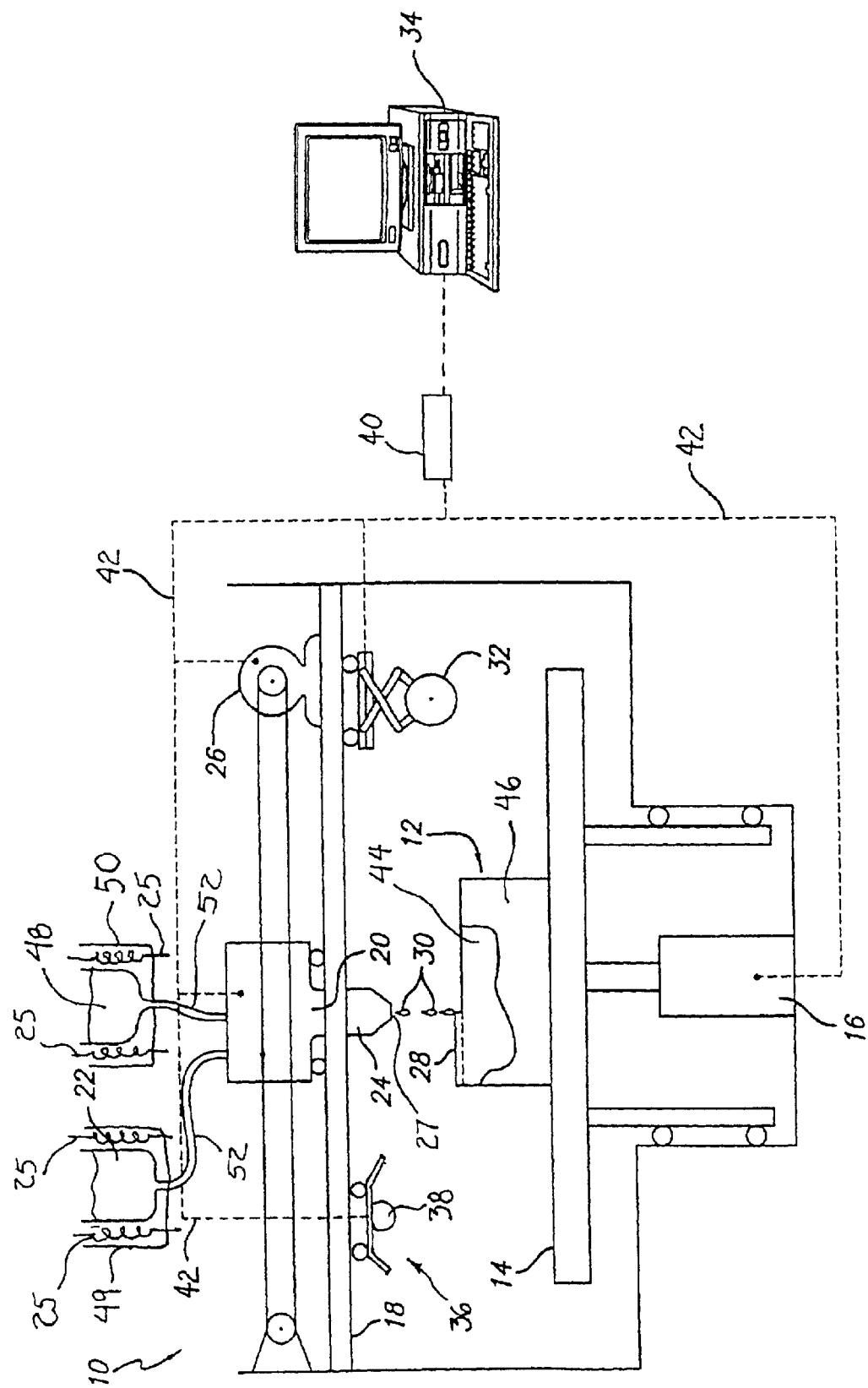
FIG. 1 is a diagrammatic side view of a solid deposition modeling apparatus for practicing the present invention.

While the present invention is applicable to all SDM techniques and objects made therefrom, the invention will be described with respect to a SDM technique utilizing an ink jet print head dispensing a ultraviolet radiation curable phase change material. However it is to be appreciated that the present invention can be implemented with any SDM technique utilizing a wide variety of curable phase change materials. For example, the curable phase change material can be cured by exposure to actinic radiation having wavelengths other than in the ultraviolet band of the spectrum, or by subjecting the material to thermal heat.

As used herein, the term "a flowable state" of a build material is a state wherein the material is unable to resist shear stresses that are induced by a dispensing device, such as those induced by an ink jet print head when dispensing the material, causing the material to move or flow. Preferably the flowable state of the build material is a liquid state, however the flowable state of the build material may also exhibit thixotropic like properties. The term "solidified" and "solidifiable" as used herein refer to the phase change characteristics of a material where the material transitions from the flowable state to a non-flowable state. A "non-flowable state" of a build material is a state wherein the material is sufficiently self-supportive under its own weight so as to hold its own shape. A build material existing in a solid state, a gel state, a paste state, or a thixotropic state, are examples of a non-flowable state of a build material for the purposes herein. In addition, the term "cured" or "curable" refers to any polymerization reaction. Preferably the polymerization reaction is triggered by exposure to actinic radiation or thermal heat. Most preferably the polymerization reaction involves the cross-linking of monomers and oligomers initiated by exposure to actinic radiation in the ultraviolet or infrared wavelength band. Further, the term "cured state" refers to a material, or portion of a material, in which the polymerization reaction has substantially completed. It is to be appreciated that as a general matter the material can easily transition between the flowable and non-flowable state prior to being cured, however, once cured, the material cannot transition back to a flowable state and be dispensed by the apparatus.

According to the present invention it has been discovered that when working with radiation curable phase change materials in SDM it is desirable to dispense the material at the lowest possible temperature. This is due to a variety of related reasons of which the most significant reason is to prevent thermal initiation of the cure process when the material is in the flowable state prior to being dispensed. This is to be avoided since thermal initiation of the cure process can clog the print head causing the apparatus to malfunction. Even if the SDM apparatus were operated continuously to dispense the material, the dispensing orifices at the proximal and distal ends of the print head may clog, as they often remain idle for substantial periods of time. Still further, dispensing at the lowest temperature possible minimizes the quantity of thermal heat initially introduced into the object being formed. This is important since during the cure process initiated by actinic radiation, a significant amount of exothermal heat is generated. This heat, in addition to the heat already present in the material after solidification, must be kept to a minimum so that the temperature of a previously formed layer does rise above the freezing point of the material. If this occurred, the build process will fail as the next layer of dispensed material will not solidify, but rather remain in the flowable state and run off the object. Thus, the additional heat generated by the cure process must be compensated for by lowering the dispensing temperature of the material so that subsequent layers of the dispensed material will solidify on contact with the cured layers. Just how much heat is generated depends on a number of factors, but is generally related to the quantity and type of reactive material in the formulation. In some circumstances it may also be desirable to provide an active or passive cooling system to remove heat from the surface of the object. For example, an active cooling system may drive a current of air across the surface of the object as it is being formed to remove the exothermal heat by convection. A passive cooling system could comprise a large thermally conducting build platform functioning like a heat sink that could draw the exothermal heat by conduction. Thus, a cooling system can be used to provide an environment that keeps the temperature of the cured material below the freezing point of the material that is to be dispensed to form the next layer.

In the preferred embodiment, a Z850 print head is used to dispense the curable phase change material, although other dispensing devices could be used, if desired. It is recommended that the material being dispensed from the Z850 print head have a viscosity of between about 13 to about 14 centipoise. Prior experience in dispensing thermoplastic phase change formulations from print heads in SDM have found a variance in viscosity of less than about 20% produces acceptable dispensing results. Still further experience with SDM techniques has shown that the materials must generally be maintained at or near the dispensing temperature for extended periods of time. This is necessary in order to keep the material in a state of readiness for dispensing. The time period can be minutes, hours, days, or weeks. For example, it is possible that an operator could forget to turn off an SDM apparatus, in which case the apparatus could remain on for weeks at a time. During this time the material in the reservoirs and print head would be maintained at the dispensing temperature. It would be undesirable if the viscosity of the material in the apparatus increased beyond about 20% of its intended value. If this occurs, the print head could clog making the apparatus inoperable, or the material would not dispense properly causing the build process to fail. For these reasons, it is desired that materials dispensed in SDM do not increase in viscosity by more than about 20% when held at the dispensing temperature for about four weeks. Preferably the viscosity increase of the material should be less than about 5% when held at the dispensing temperature for four or more weeks. Ideally no increase in viscosity is desired, however this is generally not possible when working with radiation curable phase change materials.

Thermal aging test were conducted to determine an acceptable temperature range in which to operate the Z850 print head in conjunction with dispensing a radiation curable phase change material so as to stay within about 20% of the viscosity increase limitation for a desired time period. These tests were conducted on a number of formulations held at different elevated temperatures for extended periods of time. During these time periods, viscosity measurements of the formulations were taken in order to determine the state of cure of the formulations. Formulations that exhibited a substantially sharp increase in viscosity indicated that the cure process was strongly triggered by thermal initiation, rendering formulation unacceptable. Testing was conducted at elevated temperatures of about 95° C., 85° C., 80° C., and 65° C. for a number of formulations. Results varied, particularly since various small amounts of inhibitors and antioxidants were added to some formulations in attempts to further inhibit the cure process as much as possible. Prior to testing the formulations it was decided an unacceptable increase in viscosity be limited to no greater than about 20% at any elevated temperature, and the length of time the formulations remained under this amount were determined. Formulations whose viscosity increased beyond this value very quickly, such as within hours, were considered unacceptable. The preferred viscosity range of between about 13 to about 14 centipoise was desired for dispensing. The upper viscosity limit was determined to be about 18 centipoise, and preferably about 16.8 centipoise. The lower viscosity limit was determined to be about 10.5 centipoise as some formulations tested were successfully dispensed having a viscosity value of about 10.5 centipoise when dispensed. Thus, from the data of each test, an acceptable thermally stable time period could be determined for each formulation held at a given temperature. This desired time period is referred to herein as the dispensing life of the material, and is the minimum desired time period in which the reactive component of the material remains substantially uncured when the material is maintained at the dispensing temperature. At a minimum, the dispensing life of the material should be at least about 1 hour, and preferably between about 2 to about 8 weeks.

Generally, all of the formulations held at 95° C. had an unacceptable dispensing life of less than about 3 days. Most of the formulations that were held at 85° C. and at 80° C. had a generally acceptable dispensing life of about 2–3 weeks. Most all of the formulations that were held at 65° C. had a determined dispensing life of about 2 to about 8 weeks. From these tests a consensus was reached that the highest thermally stable temperature for dispensing a radiation curable phase change formulation is about 90° C., as this value is between the unacceptable results obtained at 95° C. and the generally acceptable results obtained at 85° C. In addition, by adjusting the amount of inhibitors and antioxidants in the formulation, it is believed that dispensing radiation curable formulations at this temperature is feasible and can be accomplished particularly if the acceptable dispensing life of the material is about 3 weeks or less.

Damage to the piezo elements in the Z850 print head start to occur at temperatures below about 60° C. Thus, the useable dispensing temperature range for the Z850 print head was determined to be between about 60° C. to about 90° C. for dispensing radiation curable phase change materials, with the preferred dispensing temperature range being between about 60° C. to about 85° C., and the most preferred dispensing temperature being about 80° C. Hence, a thermally stable dispensing environment can be provided for dispensing a radiation curable phase change material when the dispensing temperature is between about 60° C. to about 90° C.

An alternative approach may be used to determine the appropriate dispensing temperature, if desired. According to this approach, the dispensing life and formulation can be pre-selected, and the thermally stable temperature could be determined via testing. The testing could be conducted to determine the greatest temperature at which the material can be maintained in a flowable state for a pre-selected time period, such as at least one hour, in which the reactive component in the material remains substantially uncured. The desired time period may be between about 2 to about 8 weeks if long shelf life is required. Data compiled by measuring the change in viscosity of the material over the desired time period can be used to determined whether the material remains substantially uncured, for instance, when the viscosity does not increase by more than about 20%. If the material has an initial viscosity of between about 13 to about 14 centipoise, an increase to no greater than about 18 centipoise is desired, and preferably no greater than 16.8 centipoise. Testing could continue at different temperatures, and from the data a thermally stable temperature could be determined. Then the dispensing temperature for the apparatus need only be set to be equal to or less than this temperature to assure continuous and reliable dispensing. Thus, in this alternative approach the dispensing temperature could be tailored for a specific curable phase change formulation.

A number of radiation curable phase change build material formulations were developed. The formulations were developed to be cured by exposure to ultraviolet radiation and have a viscosity of between about 13 to about 14 centipoise at a temperature of about 80° C. The material formulations were targeted to have a melting point of between about 50° C. to about 60° C., and a freezing point of between about 45° C. to about 55° C. It is desired that the melting point of the material is at least lower than the dispensing temperature, but generally not lower than about 50° C., otherwise the dispensed material may not solidify in the environment where exothermic heat continues to be released from previously cured layers. A melting point of between about 50° C. and about 80° C. is acceptable, although preferably between about 50° C. and about 60° C. to assure the material remains in the flowable state in light of temperature variations that can occur in the print head.

In a preferred embodiment a non-curable phase change support material is dispensed from the same print head as the curable phase change build material. The support material must have a similar melting point, freezing point, and viscosity at the dispensing temperature as the curable phase change build material for this embodiment. Hence, the support material is preferably formulated to have the same phase change characteristics as the curable phase change build material.

The curable phase change build material formulations had a dispensing life of at least about 4 weeks according to the thermal aging tests. It is believed the formulations have a dispensing life of at least about 5–8 although the tests were not conducted for periods beyond 4 weeks. The formulations generally comprise between about 20% to about 40% by weight of high molecular weight monomers and oligomers, between about 10% to about 60% by weight of low molecular weight monomers, between about 1% to about 6% by weight of a photoinitiator, and between about 5% to about 25% by weight wax. The reactive components of both high and low molecular weight comprise between about 75% to about 95% by weight of the material. The combination of high and low molecular weight monomers and oligomers were accordingly adjusted so as to achieve the desired viscosity of between about 13 to about 14 centipoise for the formulation at a temperature of about 80° C. For the high molecular weight monomers both urethane acrylates and epoxy acrylates were used, separately and in combination. For the low molecular weight monomers, methacrylates, dimethacrylates, triacrylates, and diacrylates were used in a variety of combinations. Non-reactive urethane waxes were used, however, other waxes could be used such as carbon hydrogenated waxes, paraffin waxes, fatty ester waxes, and the like. The components of four exemplary build material formulations are provided by weight percent in Table 1.

TABLE 1

| Mfg. ID No. | General Component Name | Ex. 1 | Ex. 2 | Ex. 3 | Ex. 4 |
| --- | --- | --- | --- | --- | --- |
| CN980 | Urethane Acrylate | 7.2% | | | 6.5% |
| CN981 | Urethane Acrylate | | | 26% | |
| E3200 | Epoxy Acrylate | | | 14% | 6.0% |
| CN975 | Hexafunctional Urethane Acrylate | | 7.2% | | |
| CN2901 | Urethane Acrylate | 27.5% | 27% | | 18.7% |
| SR203 | Tetrahydrofurfuryl Methacrylate | | | | |
| SR205 | Triethylene glycol dimethacrylate | 33% | | 46.5% | 41.05% |
| SR340 | 2-phenoxyethyl methacrylate | | | | |
| SR313 | Lauryl methacrylate | | 18% | | |
| SR454 | Ethoxylated$_3$ Trimethylolpropane Triacrylate | | 4.5% | | |
| SR604 | polypropylene glycol monomethacrylate | | | | 12.0% |
| CD406 | Cyclohexane dimethanol diacrylate | | 30% | | |
| SR493D | Tridecyl Methacrylate | 19% | | | |
| ADS038 | Urethane wax | 7% | 5.3% | 10% | 10.0% |
| ADS043 | Urethane wax | 4.3% | 6% | 1.5% | 2.0% |
| I-184 | Photo-initiator | 2% | 2% | 2% | 3.75% |
| TOTAL | | 100% | 100% | 100% | 100.0% |

The following components used in the four formulations listed in Table 1 are available from Sartomer Company, Inc. of Exton Pa. under the following designations: CN 980, CN 981, CN 975, CN2901, SR 203, SR 205, SR 340, SR 313, SR 454, CD 406, SR604, and SR 493D. The components ADS 038 and ADS 043 are available from American Dye Source, Inc. of Quebec, Canada. The epoxy acrylate under the designation E 3200 is available from UCB Chemical, Inc. of Atlanta, Ga. The photoinitiator under the designation I-184 listed is available from Ciba Specialty Chemicals, Inc. of New York, N.Y.

The formulations in Table 1 where made in accordance with the present invention by mixing the individual components in a kettle equipped with a mixing blade. A kettle was preheated to about 85° C. and the components placed into the kettle, the kettle closed and stirring was commenced. Stirring continued as the components eventually equalized to the temperature of the kettle. Stirring was then continued until a homogenized molten state was achieved. The viscosity was measured and adjusted as needed. It took approximately 2.5 hours to mix a 75 pound quantity of the formulations to a homogenized state. The formulations were then removed from the kettle and filtered through a 1 micron absolute filter while in the flowable state. The formulations were then cooled to ambient temperature at which they transitioned from the flowable to the non-flowable state.

In a preferred embodiment, the SDM apparatus dispenses a preferred UV curable phase change material to form the object, such as that in Example 4 of Table 1, and another non-curable phase change material to form supports for the object, as needed. This is desired so that the non-curable phase change material can be removed from the cured object by application of a solvent to dissolve the support material or by application of heat to melt the support material. The support material may be a thermoplastic phase change material such as that disclosed in U.S. Pat. No. 6,132,665 to Bui et al. Alternatively, the support material may be a water-soluble material, if desired, which may include a fluorosurfactant to lower the surface tension of the material to improve the drop shape and cohesion of the jetted material. In addition, the material may be a gel material, such as gelatin that can be wiped away from the object, if desired. In addition, the support material may exhibit mechanically weak properties in which it can be easily crumbled away from the three-dimensional object.

In a preferred SDM apparatus of the present invention, a Z850 print head is configured to also dispense a non-curable phase change support material as well as the curable phase change build material. A preferred support material formulation comprises 70% by weight octadecanol available from Ruger Chemical Co., Inc., of Irvington, N.J., and 30% by weight of a tackifier sold under the designation of KE 100 available from Arakawa Chemical (USA) Inc., of Chicago, Ill. This support material formulation has a viscosity of about 11.0 centipoise at a temperature of about 80° C., and a melting point of about 58° C. and a freezing point of about 49° C. The formulation was mixed in a kettle equipped with a mixing blade. The kettle is preheated to about 85° C. and the octadecanol is placed into the kettle first, as it has the lower melting point. The kettle is closed and stirring commenced. Once the octadecanol has melted, the KE 100 is added to the mixture while stirring continues. The kettle is closed and stirring continues until a homogenized state of the mixture is achieved. The viscosity is measured and adjusted if needed. The formulation is then removed from the kettle and filtered through a 1 micron absolute filter while in the flowable state. The formulation is then cooled to ambient temperature wherein it transitions from the flowable to the non-flowable state.

Surfactants such as fluorosurfactants may be added to any of the formulations of build and support material to improve cohesion of the material and drop shape when the materials are jetted. Generally, adding fluorosurfactants can enable high surface tension liquids to be jetted. Fluorosurfactants in concentrations between about 0.01% to about 0.10% may be added, particularly to highly polar water-soluble phase change formulations, and to formulations that include moderately polar inks. For UV curable phase change formulations, fluorosurfactants can lower the surface tension from about 33 dynes/cm$^2$ to about 27 dynes/cm$^2$.

The curable formulations were dispensed from a Z850 print head that was modified to dispense the materials at a temperature of about 80° C. Test parts were formed in which each layer was cured by flood exposure to actinic radiation. The parts were then tested to determine the resulting physical properties achieved. The physical properties measured for the first three formulations are provided in Table 2 along with their viscosity values, melting points and freezing points.

TABLE 2

| Property | Ex. 1 | Ex. 2 | Ex. 3 | Ex. 4 |
| --- | --- | --- | --- | --- |
| Viscosity at 80° C. | 12.9 cps | 12.9 cps | 12.9 cps | 12.8 cps |
| Melting point ° C. | 52° C. | 55° C. | 57° C. | 56° C. |
| Freezing point ° C. | 46° C. | 47.5° C. | 50° C. | 49.5° C. |
| Elongation % E (after cure) | 9% | 4% | 5% | 11.3% |
| Tensile Strength (psi) (after cure) | 2,340 psi | 2,383 psi | 5,597 psi | 2,538 psi |
| Tensile Modulus (psi) (after cure) | 92,000 psi | 116,000 psi | 267,000 psi | 96,130 |

These mechanical properties (tensile strength and tensile modulus) are far superior to those properties obtained in SDM using thermoplastic phase change materials. For example, in U.S. Pat. No. 6,132,665 to Bui et al., the non-curable thermoplastic phase change formulation disclosed has an Elongation of 73% and a tensile stress of 435 psi (3 MPa). These physical properties are representative of those achieved using the Thermojet® solid object printer dispensing Thermojet® 2000 build material, both apparatus and material sold by 3D Systems, Inc. of Valencia, Calif. The four curable phase change formulations clearly exhibit superior tensile strength and durability compared to the non-curable thermoplastic formulations. For instance, the tensile strength of the formulation in Example 1 is over 5 times greater than the tensile strength of the non-curable thermoplastic formulation. The formulation in Example 4 is preferred since it is less brittle than the other formulations and therefore more durable.

Referring particularly to FIG. 1 there is illustrated generally by the numeral 10 a SDM apparatus for practicing the present invention SDM process. The SDM apparatus 10 is shown building a three-dimensional object 44 on a support structure 46 in a build environment shown generally by the numeral 12. The object 44 and support structure 46 are built in a layer by layer manner on a build platform 14 that can be precisely positioned vertically by any conventional actuation means 16. Directly above and parallel to the platform 14 is a rail system 18 on which a material dispensing trolley 20 resides carrying a dispensing device 24. Preferably the dispensing device 24 is an ink jet print head that dispenses a build material and support material and is of the piezoelectric type having a plurality of dispensing orifices. However, other ink jet print head types could be used, such as an acoustic or electrostatic type, if desired. A preferred ink jet print head is the Z850 print head available from Xerox Corporation of Wilsonville, Oreg. Alternatively a thermal spray nozzle could be used instead of an ink jet print head, if desired.

The trolley carrying the print head 24 is fed the curable phase change build material 22 from a remote reservoir 49. The remote reservoir is provided with heaters 25 to bring and maintain the curable phase change build material in a flowable state. Likewise, the trolley carrying the print head 24 is also fed the non-curable phase change support material from remote reservoir 50 in the flowable state. In order to dispense the materials, a heating means is provided to initially heat the materials to the flowable state, and to maintain the materials in the flowable state along its path to the print head. The heating means comprises heaters 25 on both reservoirs 49 and 50, and additional heaters (not shown) on the umbilicals 52 connecting the reservoirs to the print head 24. Located on the print head 24 is a plurality of discharge orifices 27 for dispensing both the build material and support material, although just one is shown in FIG. 1. Each discharge orifice is dedicated to dispense either the build material or the support material in a manner that either material can be dispensed to any desired target location in the build environment.

A reciprocating means that is provided for the dispensing device 24 which is reciprocally driven on the rail system 18 along a horizontal path by a conventional drive means 26 such as an electric motor. Generally, the trolley carrying the dispensing device 21 takes multiple passes to dispense one complete layer of the materials from the discharge orifices 27. In FIG. 1, a portion of a layer 28 of dispensed build material is shown as the trolley has just started its pass from left to right. A dispensed droplet 30 is shown in mid-flight, and the distance between the discharge orifice and the layer 28 of build material is greatly exaggerated for ease of illustration. The layer 28 may be all build material, all support material, or a combination of build and support material, as needed, in order to form and support the three-dimensional object.

The build material and support material are dispensed as discrete droplets 30 in the flowable state, which solidify upon contact with the layer 28 as a result of a phase change. Alternatively, the materials may be dispensed in a continuous stream in an SDM system, if desired. Each layer of the object is divided into a plurality of pixels on a bit map, in which case a target location is assigned to the pixel locations of the object for depositing the curable phase change material 22. Likewise, pixel coordinates located outside of the object may be targeted for deposition of the non-curable phase change material 48 to form the supports for the object as needed. Generally, once the discrete droplets are deposited on all the targeted pixel locations of the bit map to establish an initial layer thickness, a solid fill condition is achieved. Preferably the initial layer thickness established during dispensing is greater than the final layer thickness such that the solid fill condition for each layer contains material in excess of that needed for the layer.

A planarizer 32 is drawn across the layer to smooth the layer and normalize the layer to establish the final layer thickness. The planarizer 32 is used to normalize the layers as needed in order to eliminate the accumulated effects of drop volume variation, thermal distortion, and the like, which occur during the build process. It is the function of the planarizer to melt, transfer, and remove portions of the dispensed layer of build material in order to smooth it out and set a desired thickness for the last formed layer prior to curing the material. This ensures a uniform surface topography and layer thickness for all the layers that form the three-dimensional object, however it produces waste material that must be removed from the system. The planarizer 32 may be mounted to the material dispensing trolley 20 if desired, or mounted separately on the rail system 18, as shown.

The planarizer 32 is utilized in SDM building techniques that deposit build material in excess of a desired thickness for each layer according to data of a prescribed pattern for each layer, and then the planarizer removes the excess build material from each layer to achieve the desired thickness. The use of the planarizer according to the present invention is preferred generally because it does not require an active feedback system that monitors the surface condition of a given layer. Importantly, however, planarizing must be completed for a given layer prior to curing the layer.

In an alternative embodiment for normalizing the layers, a surface scanning system can be provided. Such a system would actively monitor the surface condition of any given layer and provide feedback data that can be used to selectively dispense additional material in low areas to form a uniform layer. One such system is disclosed in U.S. Ser. No. 09/779,355 to Kerekes, filed on Feb. 8, 2001 which is herein incorporated by reference as set forth in full. Such a closed loop system would be desirable to actively control the accumulation of material forming the layers. Such a system could increase build speed by eliminating the necessity to dispense material in excess of that required for a layer which is then removed by a planarizer. Hence a surface scanning system may be used, if desired, in conjunction with the present invention to normalize the layers.

A waste collection system (not shown in FIG. 1) is used to collect the excess material generated during planarizing. The waste collection system may comprise an umbilical that delivers the material to a waste tank or waste cartridge, if desired. A preferred waste system for curable phase change materials is disclosed in U.S. patent Ser. No. 09/970,956 assigned to 3D Systems, Inc., which is herein incorporated by reference as set forth in full.

In the embodiment shown in FIG. 1, a single print head dispenses both the curable phase change material and the non-curable phase change material. Alternatively, multiple print heads could be used, each being dedicated to dispensing either or both of the materials. Preferably the non-curable material is selected so as to be easily removed from the three-dimensional object at the end of the layerwise build process, yet have a similar melting point and freezing point as the curable material so that dispensing and planarizing will be uniform. In this embodiment, separate material delivery systems are required for the two different materials, however only one waste collection system is needed since the waste is a combination of both materials collected after planarizing.

Unique to the SDM apparatus 10 is the provision of an actinic radiation source generally shown by numeral 36 mounted on rail system 18. The radiation source 36 is reciprocally driven along rail system 18 to position the radiation source over a just formed layer of material. The radiation source 36 includes an ultraviolet radiation emitting bulb 38 which is used to provide flood exposure of UV radiation to each layer after the planarizer has normalized the layer. Alternatively multiple layers can be dispensed and normalized prior to curing by flood exposure to UV radiation. The exposure is executed in a flash manner, preferably by turning on and off the bulb 38 at a desired time, such as after the planarizer has been retracted from the build area and while the radiation source is traversed along the rail system over the build area. Alternatively, the bulb could remain on and a shutter system could be used to control the flash operation of exposure, if desired. Although the actinic radiation source 36 is shown reciprocally mounted on rail system 18, it may be mounted directly on the dispensing trolley, if desired. It is important to shield the print head and planarizer from exposure to the actinic radiation so as to prevent curing material in the dispensing orifices or on the surface of the planarizer, either of which would ruin the build process and damage the apparatus.

Preferably, an external computer 34 generates or is provided with a solid modeling CAD data file containing three-dimensional coordinate data of an object to be formed. Typically the computer 34 converts the data of the object into surface representation data, most commonly into the STL file format. In the preferred embodiment, the computer also establishes data corresponding to support regions for the object. When a user desires to build an object, a print command is executed at the external computer in which the STL file is processed, through print client software, and sent to the computer controller 40 of the SDM apparatus 10 as a print job. The processed data transmitted to the computer controller 40 can be sent by any conventional data transferable medium desired, such as by magnetic disk tape, microelectronic memory, network connection, or the like. The computer controller processes the data and executes the signals that operate the apparatus to form the object. The data transmission route and controls of the various components of the SDM apparatus are represented as dashed lines at 42.

The formulations for the build material and support material were dispensed by the SDM apparatus 10 while in a flowable state. The preferred build material formulation is Example 4 provided in Table 1. This formulation was preferred because it is the most durable having the highest Elongation (11.3%) while still having substantially improved tensile strength compared to prior art thermoplastic phase change materials. The build and support formulations solidified substantially upon contact with the build platform 14 for the first layer, and on top of previously formed layers for subsequent layers. The freezing point of the material, the point the material solidifies to the non-flowable state, is desired to be in a range of between about 40° C. to about 80° C. Preferably the actual freezing point should lean towards the higher temperature, if possible, to assure solidification in light of exothermic heat being generated during cure. Typically the freezing point of the materials tested fell within a range of between about 40° C. to about 50° C. in view of a targeted range of about 45° C. to about 55° C. In these tests active cooling was not needed to assist in lowering the temperature of the dispensed material to solidify, however it may be needed when forming large objects which may produce a significant amount of exothermic heat after cure to interrupt the solidification process.

After all the material for each layer was dispensed and solidified, a planarizer 32 was then used to normalize each layer. After normalization, each layer is then provided with a flood exposure to UV radiation by radiation source 38 which is part of an exposure trolley 38. The flood exposure cures the build material and not the support material. Sample parts were made in this manner and the support material removed to expose the three-dimensional objects.

The support material is removed by further processing. Generally, application of thermal heat to bring the support material back to a flowable state is needed to remove substantially all of the support material from the three-dimensional object. This can be accomplished in a variety of ways. For example, the part can be placed in a heated vat of liquid material such in water or oil. Physical agitation may also be used, such as by directing a jet of the heated liquid material directly at the support material. This can be accomplished by steam cleaning with appropriate equipment. Alternatively, the support material can also be removed by submersing the material in an appropriate liquid solvent to dissolve the support material.

Figure 2:
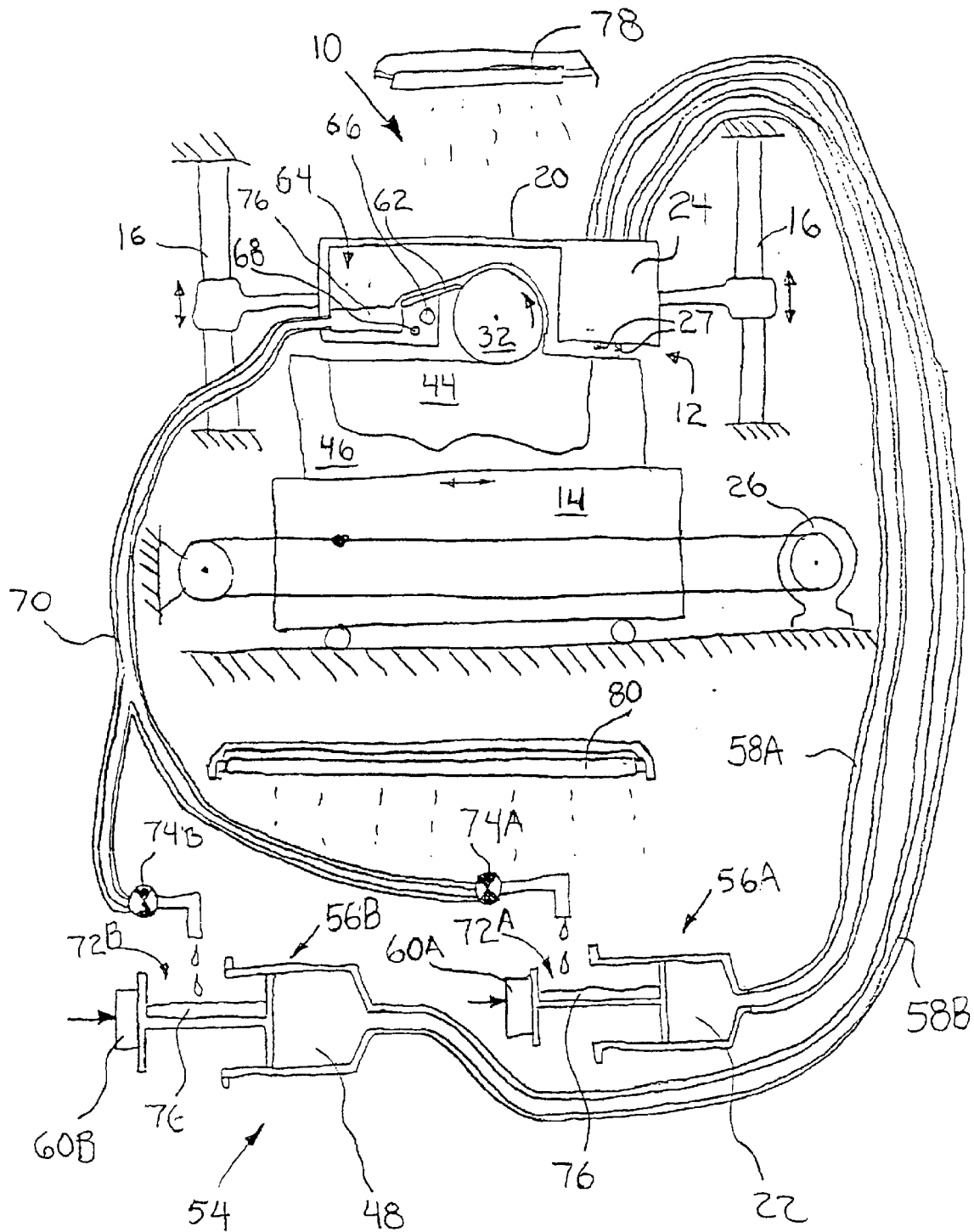
FIG. 2 is a diagrammatic side view of a preferred embodiment of a solid deposition modeling apparatus for practicing the present invention.

Referring particularly to FIG. 2 there is illustrated generally by the numeral 10 a preferred embodiment of a solid freeform fabrication apparatus for practicing the present invention. This apparatus 10 is shown including schematically a material feed and waste system illustrated generally by numeral 54. In contrast to the SDM apparatus shown in FIG. 1, the build platform 14 in this embodiment is reciprocally driven by the conventional drive means 26 instead of the dispensing trolley 20. The dispensing trolley 20 is precisely moved by actuation means 16 vertically to control the thickness of the layers of the object. Preferably the actuation means 16 comprises precision lead screw linear actuators driven by servomotors. In the preferred embodiment the ends of the linear actuators 16 reside on opposite ends of the build environment 12 and in a transverse direction to the direction of reciprocation of the build platform. However for ease of illustration in FIG. 2 they are shown in a two-dimensionally flat manner giving the appearance that the linear actuators are aligned in the direction of reciprocation of the build platform 14. Although they may be aligned with the direction of reciprocation, it is preferred they be situated in a transverse direction so as to optimize the use of space within the apparatus.

In the build environment generally illustrated by numeral 12, there is shown by numeral 44 a three-dimensional object being formed with integrally formed supports 46. The object 44 and supports 46 both reside in a sufficiently fixed manner on the build platform 14 so as to sustain the acceleration and deceleration effects during reciprocation of the build platform while still being removable from the platform. In order to achieve this, it is desirable to dispense at least one complete layer of support material on the build platform before dispensing the build material since the support material is designed to be removed at the end of the build process. In this embodiment, the curable phase change build material identified by numeral 22 is dispensed by the apparatus 10 to form the three-dimensional object 44, and the non-curable phase change material identified by numeral 48 is dispensed to form the support 46. Containers identified generally by numerals 56A and 56B respectively hold a discrete amount of these two materials 22 and 48. Umbilicals 58A and 58B respectively deliver the material to the print head 24. The materials 22 and 48 are heated to a flowable state, and heaters (not shown) are provided on the umbilicals 58A and 58B to maintain the materials in the flowable state as they are delivered to the print head 24. In this embodiment the ink jet print head is configured to dispense both materials from a plurality of dispensing orifices so that both materials can be selectively dispensed in a layerwise fashion to any target location in any layer being formed. When the print head 24 needs additional material 22 or 48, extrusion bars 60A and 60B are respectively engaged to extrude the material from the containers 56A and 56B, through the umbilicals 58A and 58B, and to the print head 24.

The dispensing trolley 20 in the embodiment shown in FIG. 2 comprises a heated planarizer 32 that removes excess material from the layers to normalize the layers being dispensed. The heated planarizer contacts the material in a non-flowable state and because it is heated, locally transforms some of the material to a flowable state. Due to the forces of surface tension, this excess flowable material adheres to the surface of the planarizer, and as the planarizer rotates the material is brought up to the skive 62 which is in contact with the planarizer 32. The skive 62 separates the material from the surface of the planarizer 32 and directs the flowable material into a waste reservoir, identified generally by numeral 64 located on the trolley 20. A heater 66 and thermistor 68 on the waste reservoir 64 operate to maintain the temperature of the waste reservoir at a sufficient point so that the waste material in the reservoir remains in the flowable state. The waste reservoir is connected to a heated waste umbilical 70 for delivery of the waste material to the waste receptacles 72A and 72B. The waste material is allowed to flow via gravity down to the waste receptacles 72A and 72B. Although only one umbilical 70 with a splice connection to each waste receptacle is shown, it is preferred to provide a separate waste umbilical 70 between the waste reservoir 64 and each waste receptacle 72A and 72B. For each waste receptacle 72A and 72B, there is associated a solenoid valve 74A and 74B, for regulating the delivery of waste material to the waste receptacles. Preferably the valves 74A and 74B remain closed, and only open when the respective extrusion bars 60A and 60B are energized to remove additional material. For example, if only extrusion bar 60A is energized, only valve 74A will open to allow waste material 76 to be dispensed into the waste receptacle 72A. This feedback control of the valves prevent delivery of too much waste material to either waste receptacle, by equalizing the delivery of waste material in the waste receptacles in proportion to the rate at which material is feed from the containers to the dispensing device. Thus, the delivery of waste material to the waste receptacles is balanced with the feed rates of build material and support material of the feed system.

After the curable phase change build material 22 and non-curable phase change support material 48 are dispensed in a layer, they transition from the flowable state to a non-flowable state. After a layer has been normalized by the passage of the planarizer 32 over the layer, the layer is then exposed to actinic radiation by radiation source 78. Preferably the actinic radiation is in the ultraviolet or infrared band of the spectrum. It is important, however, that planarizing occurs prior to exposing a layer to the radiation source 78. This is because the preferred planarizer can only normalize the layers if the material in the layers can be changed from the non-flowable to the flowable state, which cannot occur if the material 22 is first cured.

In this embodiment, both materials accumulate and are removed by the planarizer 32 to form the waste material. Preferably, a second radiation source 80 is provided to expose the waste material in the waste receptacles to radiation to cause the build material 22 in the receptacles to cure so that there is no reactive material in the waste receptacles.

Now referring to FIG. 3, the SDM apparatus schematically shown in FIG. 2 is shown as 10. To access the build environment, a slideable door 82 is provided at the front of the apparatus. The door 82 does not allow radiation within the machine to escape into the environment. The apparatus is configured such that it will not operate or turn on with the door 82 open. In addition, when the apparatus is in operation the door 82 will not open. Material feed doors 84 are provided so that the curable phase change material can be inserted into the apparatus through one door 84 and the non-curable phase change material can be inserted into the apparatus through the other. A waste drawer 86 is provided at the bottom end of the apparatus 10 so that the expelled waste material can be removed from the apparatus. A user interface 88 is provided which is in communication with the external computer previously discussed which tracks receipt of the print command data from the external computer.

What has been described are preferred embodiments in which modifications and changes may be made without departing from the spirit and scope of the accompanying

What is claimed is:

1. A method of forming a three-dimensional object in a layerwise manner, the method comprising the steps of:

generating computer data corresponding to layers of the object;

providing a thermally stable dispensing environment for a radiation curable phase change material having at least one reactive component, the dispensing environment having a dispensing temperature wherein the material can be maintained at the dispensing temperature in a flowable state for a desired time period while the reactive component of the material remains substantially uncured;

dispensing the radiation curable phase change material in a flowable state at the dispensing temperature according to the computer data to form layers of the object;

dispensing a non-curable phase change material to form supports for the object;

lowering the temperature of the dispensed material causing the radiation curable phase change material to solidify to a non-flowable state;

supporting a first dispensed layer of the three-dimensional object and providing a working surface for forming subsequent layers on top of a previous layer;

curing the solidified material by exposure to radiation; and removing the non-curable phase change material forming the supports from the object.

2. The method of claim 1 wherein the desired time period in which the curable phase change material can be maintained at the dispensing temperature while the reactive component of the material remains substantially uncured is at least 1 hour.

3. The method of claim 2 wherein the curable phase change material can be maintained at the dispensing temperature for at least 1 hour while the viscosity of the material does not increase by more than about 20%.

4. The method of claim 1 wherein the desired time period in which the curable phase change material can be maintained at the dispensing temperature while the reactive component of the material remains substantially uncured is between about 2 to about 8 weeks.

5. The method of claim 4 wherein the curable phase change material can be maintained at the dispensing temperature for about 2 to about 8 weeks while the viscosity of the material does not increase by more than about 20%.

6. The method of claim 1 wherein the dispensing temperature is no greater than about 90° C. and the radiation curable phase change material has a viscosity of no greater than about 18 centipoise at the dispensing temperature.

7. The method of claim 1 wherein the dispensing temperature is about 80° C. and the radiation curable phase change material has a viscosity of about 13 centipoise at the dispensing temperature.

8. The method of claim 1 wherein the step of dispensing the material comprises using at least one print head having a plurality of dispensing orifices for dispensing the radiation curable phase change material at a viscosity of between about 10.5 to about 18 centipoise at the dispensing temperature.

9. The method of claim 1 further comprising the step of:

passing a planarizer over the solidified material to establish a layer thickness for each layer prior to curing the layer.

10. The method of claim 1 wherein the step of curing the radiation curable phase change material is performed after at least two layers of the object have been formed.

11. The method of claim 1 wherein the step of curing the solidified dispensed radiation curable phase change material is performed for each layer after each layer is dispensed and prior to dispensing a next layer of material.

12. The method of claim 1 wherein the step of curing the radiation curable phase change material is performed by providing flood exposure to ultraviolet radiation.

13. The method of claim 1 wherein the step of lowering the temperature of the dispensed radiation curable phase change material to solidify the material comprises lowering the temperature to between about 40° C. to about 80° C.

14. The method of claim 1 wherein the step of lowering the temperature of the dispensed radiation curable phase change material to solidify the material comprises lowering the temperature to between about 40° C. to about 55° C.

15. The method of claim 1 wherein the method is performed by a selective deposition modeling system.

16. A method for forming a three-dimensional object in a layerwise manner, the method comprising the steps of:
generating computer data corresponding to layers of the object;
providing a radiation curable phase change material having at least one reactive component, the material having a thermally stable temperature, the thermally stable temperature being the greatest temperature at which the material can be maintained for a desired time period in which the reactive component in the material remains substantially uncured;
elevating the temperature of the radiation curable phase change material to a dispensing temperature wherein the material transitions to a flowable state, the dispensing temperature being equal to or less than the thermally stable temperature;
dispensing the radiation curable material in the flowable state at the dispensing temperature according to the computer data to form a layer of the object;
dispensing a non-curable phase change material to form supports for the object;
lowering the temperature of the dispensed material causing the material to solidify to a non-flowable state;
curing the dispensed material by exposure to radiation; and
removing the non-curable phase change material forming the supports from the object.

17. The method of claim 16 wherein the desired time period is at least 1 hour.

18. The method of claim 17 wherein during the desired time period the viscosity of the radiation curable phase change material does not increase by more than about 20%.

19. The method of claim 16 wherein the desired time period is between about 2 to about 8 weeks.

20. The method of claim 19 wherein during the desired time period the viscosity of the radiation curable phase change material does not increase by more than about 20%.

21. The method of claim 16 wherein the dispensing temperature is not greater than 90° C. and the radiation curable phase change material has a viscosity of no greater than about 18 centipoise at the dispensing temperature.

22. The method of claim 16 wherein the dispensing temperature is about 80° C. and the radiation curable phase change material has a viscosity of about 13 centipoise at the dispensing temperature.

23. The method of claim 16 wherein the thermally stable temperature is no greater than about 90° C.

24. The method of claim 16 further comprising the step of:
passing a planarizer over the solidified material to establish a layer thickness for each layer prior to curing the layer.

25. The method of claim 16 wherein the step of curing the radiation curable phase change material is performed after at least two layers of the object have been formed.

26. method of claim 16 wherein the step of curing the solidified dispensed radiation curable phase change material is performed for each layer after each layer is dispensed and solidified.

27. The method of claim 16 wherein the step of curing the radiation curable phase change material is performed by providing flood exposure to ultraviolet radiation.

28. The method of claim 16 wherein the step of lowering the temperature of the dispensed radiation curable phase change material to solidify the material comprises lowering the temperature to between about 40° C. to about 80° C.

29. The method of claim 16 wherein the step of lowering the temperature of the dispensed radiation curable phase change material to solidify the material comprises lowering the temperature to between about 40° C. to about 55° C.

30. the method of claim 16 wherein the method is performed by a selective deposition modeling system.

31. A method for forming a three-dimensional object in a layerwise manner by solid freeform fabrication, the method comprising the steps of:
generating computer data corresponding to layers of the object;
providing a radiation curable phase change material having at least one reactive component, the curable phase change material having a thermally stable temperature and a melting point, the melting point being no greater than about 80° C., the thermally stable temperature being the greatest temperature at which the material can be maintained for a desired time period in which the reactive component in the material remains substantially uncured;
elevating the temperature of the radiation curable phase change material to a dispensing temperature, the dispensing temperature being at least equal to or greater than the melting paint of the material and at least equal to or less than the thermally stable temperature value of the material;
dispensing the radiation curable phase change material in a flowable state at the dispensing temperature according to the computer data to form layers of the object;
dispensing a non-curable phase change material to form supports for the object;
lowering the temperature of the dispensed material causing the radiation curable phase change material to solidify to a non-flowable state;
exposing the solidified dispensed radiation curable phase change material to radiation to cure the reactive component in the material; and
removing the non-curable phase change material forming the supports from the object.

32. The method of claim 31 wherein the desired time period is at least 1 hour.

33. The method of claim 32 wherein during the desired time period the viscosity of the radiation curable phase change material does not increase by more than about 20%.

34. The method of claim 31 wherein the desired time period is between about 2 to about 8 weeks.

35. The method of claim 34 wherein during the desired time period the viscosity of the radiation curable phase change material does not increase by more than about 20%.

36. The method of claim 31 wherein the dispensing temperature is no greater than about 90° C. and the radiation curable phase change material has a viscosity of no greater than about 18 centipoise at the dispensing temperature.

37. The method of claim 31 wherein the dispensing temperature is about 80° C. and the radiation curable phase change material has a viscosity of about 13 centipoise at the dispensing temperature.

38. The method of claim 31 wherein the thermally stable temperature is no greater than about 90° C.

39. The method of claim 31 further comprising the step of:
  passing a planarizer over the solidified dispensed radiation curable phase change material to establish a layer thickness for each layer prior to curing the layer.

40. The method of claim 31 wherein the step of curing the radiation curable phase change material is performed after all the layers of the object have been formed.

41. The method of claim 31 wherein the step of curing the solidified dispensed radiation curable phase change material is performed for each layer after each layer is dispensed and solidified.

42. The method of claim 31 wherein the step of curing the radiation curable phase change material is performed by providing flood exposure to ultraviolet radiation.

43. The method of claim 31 wherein the step of lowering the temperature of the dispensed radiation curable phase change material to solidify the material comprises lowering the temperature to between about 40° C. to about 80° C.

44. The method of claim 31 wherein the step of lowering the temperature of the dispensed radiation curable phase change material to solidify the material comprises lowering the temperature to between about 40° C. to about 55° C.

45. The method of claim 31 wherein the method is performed by a selective deposition modeling system.

46. A method of forming a three-dimensional object in a layerwise manner by solid freeform fabrication, the method comprising the steps of:
  generating computer data corresponding to layers of the object;
  providing a thermally stable dispensing environment for a radiation curable phase change material having at least one reactive component and a melting point; the thermally stable dispensing environment having a dispensing temperature greater than the melting point and being no greater than about 90° C.;
  dispensing the radiation curable phase change material in a flowable state at the dispensing temperature according to the computer data, the phase change material having a viscosity no greater than about 18 centipoise at the dispensing temperature;
  dispensing a non-curable phase change material to form supports for the object;
  lowering the temperature of the dispensed material below a freezing point to cause the material to solidify to a non-flowable state to form layers of the object;
  supporting a first dispensed layer of the three-dimensional object and providing a working surface for forming subsequent layers on top of a previous layer; curing the material by exposure to radiation;
  repeating the steps until the three-dimensional object is formed; and
  removing the non-curable phase change material forming the supports from the object.

47. The method of claim 46 wherein the dispensing temperature is about 80° C. and the radiation curable phase change material has a viscosity of about 13 centipoise at the dispensing temperature.

48. The method of claim 47 wherein the curable phase change material has a melting point between about 50° C. to about 80° C. and a freezing point between about 40° C. to about 80° C. and wherein the step of lowering the temperature of the radiation curable phase change material to solidify the material to the non-flowable state lowers the temperature below the freezing point of the curable phase change material.

49. The method of claim 48 wherein the melting point is between about 50° C. to about 60° C. and the freezing point is between about 40° C. to about 60° C.

50. The method of claim 47 further comprising the step of:
  generating support data corresponding to supports needed for the object;
  dispensing the non-curable phase change material in a flowable state according to the support data to form a support structure for the three dimensional object;
  lowering the temperature of the dispensed non-curable phase change material causing the material to solidify to a non-flowable state to form portions of the support structure for the object.

51. The method of claim 50 further comprising the step of:
  passing a planarizer over the solidified radiation curable and non-curable phase change material to establish a layer thickness for each layer prior to curing the layer.

52. The method of claim 51 wherein the support structure is removed from the object by wiping or breaking away.

53. The method of claim 52 wherein the support structure is removed by melting away the non-curable phase change material.

54. The method of claim 53 wherein the support structure is removed by application of a solvent that dissolves the non-curable phase change material.

55. A selective deposition modeling apparatus for forming a three-dimensional object on a layer-by-layer basis by dispensing a curable phase change material having at least one reactive component, comprising:
  a computer system for processing data corresponding to layers of the object and support regions for the object;
  means for dispensing the curable phase change material in a flowable state at a dispensing temperature according to the data processed by the computer system to form a layer, the dispensing temperature not exceeding a thermally stable temperature of the material, the thermally stable temperature being the greatest temperature that the material can be maintained at for a desired time period in which the reactive component in the material remains substantially uncured;
  means for dispensing a non-curable phase change material according to the data processed by the computer system to form supports for the object in the support regions;
  means for supporting the dispensed material as the curable phase change material solidifies to a non-flowable state to form the layers of the object;
  means for normalizing the surface of the layers to establish a uniform layer thickness; and
  means for exposing the nonflowable dispensed curable phase change material to radiation to cure the reactive component of the material.

56. The apparatus of claim 55 wherein:
  the means for dispensing the curable phase change material and the non-curable phase change material comprises at least one print head operated at a dispensing temperature no greater than about 90° C.

57. The apparatus of claim 56 wherein the at least one print head dispenses both the curable phase change material and the non-curable phase change material.

58. The apparatus of claim 57 further comprising a plurality of print heads wherein some of the print heads are dedicated to dispensing the curable phase change material and the others are dedicated to dispensing the non-curable phase change material.

59. The apparatus of claim 55 further comprising:

a means for cooling the dispensed layers to remove heat from the object to allow the dispensed curable phase change material to solidify.

60. The apparatus of claim 55 wherein the means for normalizing the surface of the layers comprises a planarizer that is passed over the nonflowable dispensed material to establish a layer thickness for each layer prior to curing the layer.

61. The apparatus of claim 60 wherein the planarizer accumulates waste material when normalizing the layers, and the apparatus further comprises:

a means for removing the waste material from the planarizer.

62. A method of forming a three-dimensional object in a layerwise manner by dispensing an actinic radiation curable build material from a dispenser, the improvement comprising:

dispensing the build material from a dispenser at a temperature of from about 60° C. to about 90° C.;

dispensing a non-curable phase change material to form supports for the object; curing the dispensed material by exposure to actinic radiation; and removing the non-curable phase change material forming the supports from the object.

63. The method of claim 62 wherein the build material is dispensed from an inkjet print head.

64. The method of claim 62 wherein the build material is dispensed at a temperature of from about 60° C. to about 80° C.

65. The method of claim 62 wherein the build material is dispensed at a viscosity of from about 10.5 to about 18 centipoise.

66. The method of claim 62 wherein the build material is dispensed at a viscosity of from about 13 to about 14 centipoise.

* * * * *